UNITED STATES PATENT OFFICE.

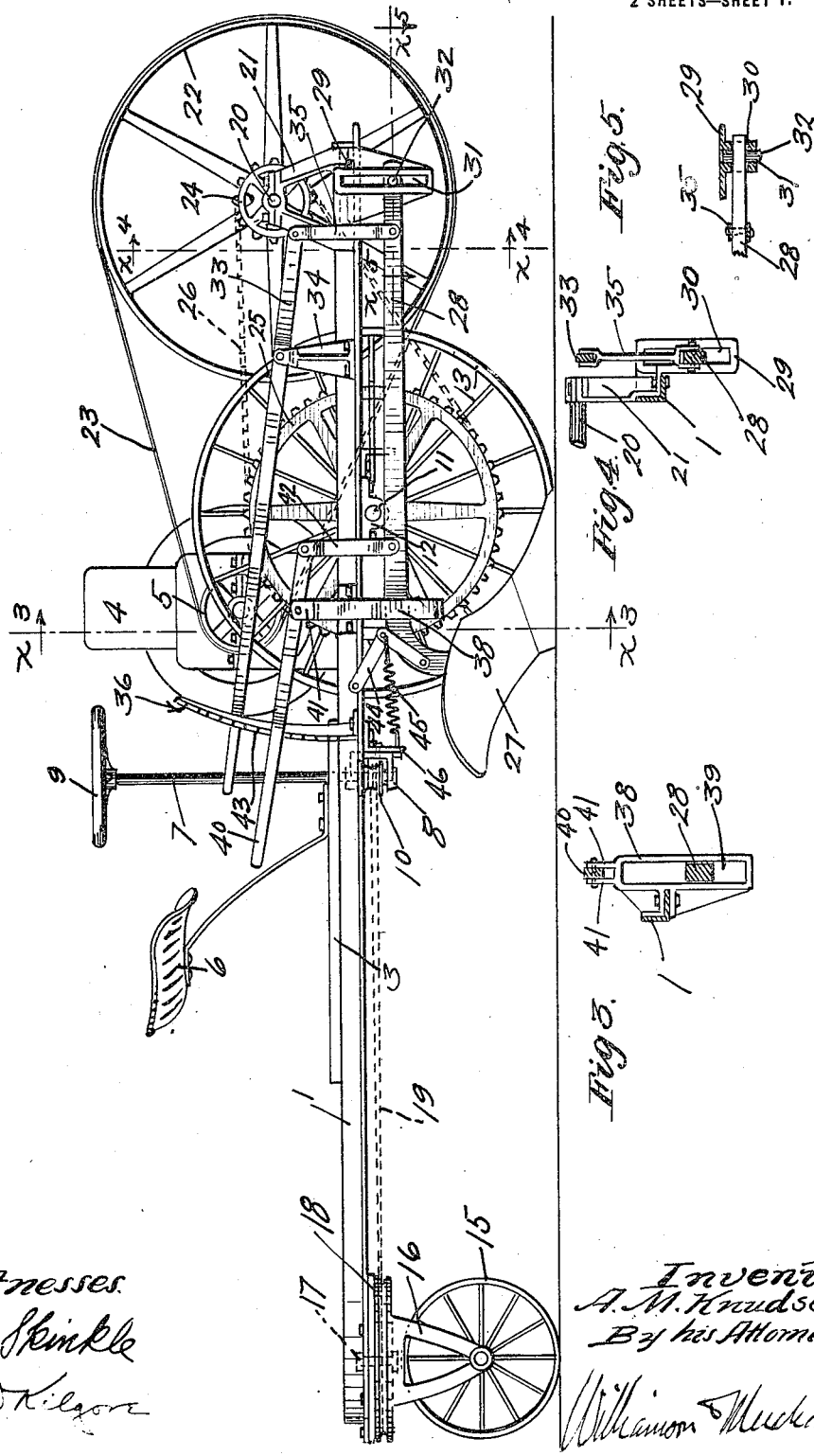

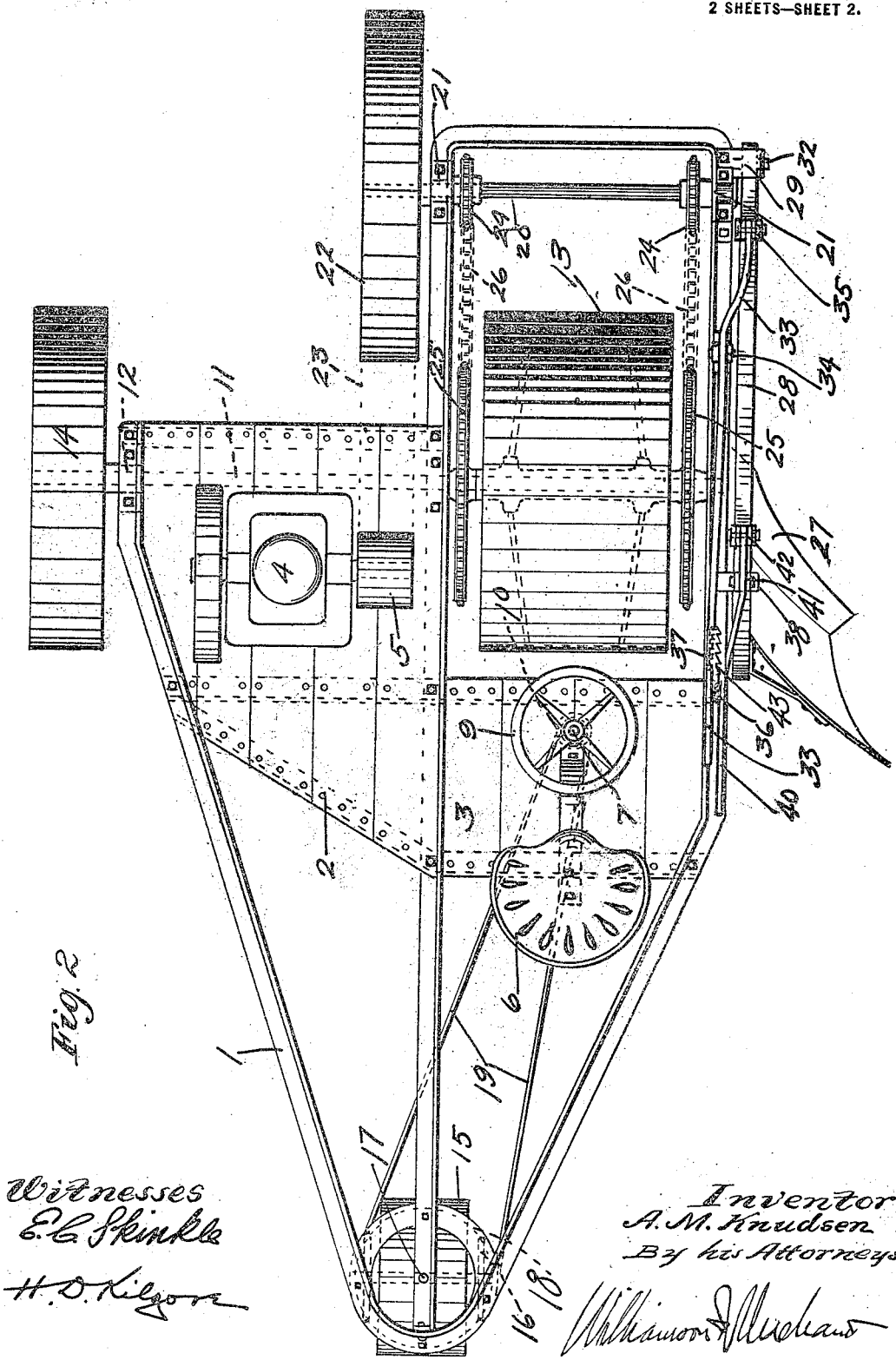

ANDREW M. KNUDSEN, OF CARTWRIGHT, NORTH DAKOTA.

TRACTION-PLOW.

1,259,638.

Specification of Letters Patent. Patented Mar. 19, 1918.

Application filed May 24, 1915. Serial No. 30,023.

*To all whom it may concern:*

Be it known that I, ANDREW M. KNUDSEN, a citizen of the United States, residing at Cartwright, in the county of McKenzie and State of North Dakota, have invented certain new and useful Improvements in Traction-Plows; and I do hereby declare the following to be a full, clear, and exact description of the invention, such as will enable others skilled in the art to which it appertains to make and use the same.

My invention has for its object to provide an extremely simple and highly efficient traction plow; and, to this end, generally stated, the invention consists of the novel devices and combinations of devices, hereinafter described and defined in the claims.

In the accompanying drawings, which illustrate the invention, like characters indicate like parts throughout the several views.

Referring to the drawings,

Figure 1 is a right side elevation of the improved traction plow;

Fig. 2 is a plan view of the same;

Fig. 3 is a detail view in section taken on the line $x^3\ x^3$ of Fig. 1;

Fig. 4 is a detail view in section taken on the line $x^4\ x^4$ of Fig. 1; and

Fig. 5 is a detail view in section taken on the line $x^5\ x^5$ of Fig. 1.

The frame of the improved traction plow comprises a rearwardly converging skeleton structure, as shown, made from angle iron, and having mounted thereon, to the left of its longitudinal center, a platform 2, and to the right of its longitudinal center, a platform 3. An explosive engine, indicated as the entirety, by the numeral 4, is mounted on the platform 2 and has keyed to its crank shaft a pulley 5. Secured to the platform 3 is an operator seat 6 and extending vertically through said platform, in front of the seat 6, is a steering post 7. This steering post 7 is journaled in a bearing bracket 8, secured to the underside of the platform 3, and has secured to its upper end a steering wheel 9, and to its lower end a flange sheave 10.

An axle 11 is journaled in depending bearings 12, secured to the side members of frame 1, just back of the front edge portion of said frame. A wide traction wheel 13 is rigidly secured to the right-hand end portion of the axle 11 and projects upward through the frame 1, directly in front of the seat 6. The left-hand end of the axle 11 projects outward of the frame 1 and has loosely journaled thereon a wheel 14.

The rear end portion of the frame 1 is supported by a steering wheel 15, journaled in a wheel bracket 16, secured to the frame 1 by a pivot bolt 17 for horizontal swinging movement. To the upper portion of the wheel bracket 16, is secured a relatively large flange sheave 18, horizontally alined with the sheave 10 and over which sheaves works a cable 19. This steering cable 19 is given several wraps around the sheaves 10 and 18 to prevent slippage thereon, and, if desired, it may be secured to the sheave 18 by a clamp or other suitable means, not shown, at a point that will not interfere with the working of said cable thereon, during the steering action. The term "cable" is herein used in a broad sense to cover a wire rope, link chain, or the like. Obviously, by turning the steering wheel 9, the desired steering movement may be imparted to the wheel 15; and hence, to the traction plow.

The traction wheel 13 is driven from the explosive engine 4 by the following connections, to wit, a counter-shaft 20 is extended parallel to the axle 11, forward of the traction wheel 13, and journaled in bearings 21, secured to the frame 1. On the left-hand end of the counter-shaft 20 is keyed a relatively large pulley 22, alined with the pulley 5 on the engine crank shaft. A belt 23 runs over the alined pulleys 5 and 22. Keyed to the counter-shaft 20, is a pair of relatively small laterally spaced sprocket wheels 24, each of which is alined with relatively large sprocket wheels 25, keyed to the axle 11. These sprocket wheels 25 are located, one on each side of the traction wheel 13, and sprocket chains 26 run over each pair of alined sprocket wheels 24 to 25. A plow 27, having a beam 28, is located just outside of the frame 1, on the opposite side of the traction wheel 13 from the laterally offset wheel 14. It is highly important to note that the point of the plow is located at a point, substantially, vertically below the projected axis of the traction wheel 13.

The free end of the plow beam 28 is attached to the frame 1 by a casting 29, bolted to the forward end of the right-hand side bar of the frame 1. This casting 29 has formed therein a vertically extended slot 30, which extends longitudinally to the frame 1, and a vertically extended slot 31, which extends at right angles to the slot 30 and transversely to the frame 1. The free end of the plow beam 28 projects through the slot 30 and is secured against endwise movement therein, but with freedom for a limited vertically raising and lowering movement by a pin 32. This pin 32 is anchored at its intermediate portion to the plow beam 28, with its end portions mounted in the slot 31 for vertically sliding movement.

The free end of the plow beam 28 is raised and lowered in the slot 30 and secured in different vertical positions by a hand lever 33, to regulate the line of draft; and hence, the depth of the furrow to be turned. The hand lever 33 is intermediately fulcrumed to a bearing bracket 34, rigidly secured to the right-hand side bar of the frame 1, rearward of the casting 29. A link 35 pivotally connects the forward or short end of the lever 33 to plow beam 28, slightly rearward of its connection with the casting 29. The lever 33 is held in different set adjustments by a vertically extended sector 36, anchored to the right-hand side bar of the frame 1, in the vicinity of the steering post 8. The left-hand edge of this sector 36 is provided with a multiplicity of circumferentially spaced notches 37, with any one of which the rear end portion of the lever 33 is adapted to engage by a lateral springing action thereof.

The rear end portion of the plow beam 28 is held by a casting 38, for straight line raising and lowering movements. This casting 38 is rigidly secured to the right-hand side bar of the frame 1 and has formed thereon a vertically extended rectangular opening 39, through which the plow beam 28 works. The plow 27 is raised and lowered by a hand lever 40, intermediately fulcrumed to and between a pair of vertically extended bearing lugs 41, integrally formed to the casting 38. The forward or short end of the lever 40 is pivotally connected to the plow beam 28, slightly forward of the casting 38, by a link 42. The lever 40 is held in different adjustments by springing the same laterally into engagement with downwardly inclined ratchet teeth 43, formed in the right-hand edge of the sector 36. The arrangement of the ratchet teeth 43 is such as to hold the lever 40 against lifting movement, but will allow the same to slip under the lifting pressure on the plow 27. Obviously, by operating the lever 40, the plow 27, may be raised and lowered at will.

The plow 27 is held to its work by a toggle lever 44 and a heavy coiled spring 45. One arm of the toggle lever 44 is pivotally connected to the plow beam 28, directly over the mold board of the plow 27, and the other arm thereof is pivotally connected with the frame 1, slightly rearward of the pivotal connection with the plow beam 28. One end of the spring 45 is anchored to the joint of the toggle lever 44, and the other end thereof is anchored to a bracket 46, secured to the frame 1, rearward of said toggle lever. The engagement of the plow beam 28, with the bottom of the slot 38, will prevent the arms of the toggle lever 44 from ever assuming true longitudinal alinement.

In case the plow should strike a stone, root, or other hard substance, the toggle lever 44 will buckle, against the action of the spring 45, and under the lifting strain on the plow. As soon as the plow is free from the obstruction, the tension of the spring 45 will tend to straighten the toggle lever 44, and thereby automatically reset the plow in the ground. During such lifting movement of the plow 27, the lever 40 will move downward over the ratchet teeth 43. In case the plow 27 runs into a root or other obstruction, of unusual strength, the belt 23 will slip on the pulley 22, and thereby stop the traction plow.

By mounting the plow 27, as above described, with its point substantially vertically under the projected axis of the traction wheel 13, it is possible to make very short turns with the improved traction plow in turning corners, which is highly desirable, as it saves much time in backing and turning to get the plow in proper position.

The above described invention has been put into successful usage and has proven highly efficient for the purpose had in view.

What I claim is:

1. A traction plow including a frame, a traction wheel and a steering wheel journaled to the frame, the latter rearward of the former, means for imparting angular steering movement to the steering wheel including a wheel-equipped steering post located directly back of the traction wheel, and a plow attached to the frame on the field side of the traction wheel with its point directly under the projected axis of the traction wheel.

2. A traction plow including a frame, a traction wheel and a steering wheel journaled to the frame, the latter rearward of the former, means for imparting angular steering movement to the steering wheel including a wheel-equipped steering post located directly back of the traction wheel, a plow attached to the frame on the field side of the traction wheel with its point directly under the projected axis of the traction wheel, and a laterally spaced wheel journaled to the frame on the land side of the traction wheel.

In testimony whereof I affix my signature in presence of two witnesses.

ANDREW M. KNUDSEN.

Witnesses:
   THEO. O. EVENSON,
   WM. SCRIMM.